United States Patent
Sondej et al.

Patent Number: 5,495,688
Date of Patent: Mar. 5, 1996

[54] FISH STRIKE ALARM SYSTEM

[76] Inventors: Sean W. Sondej; William R. Sondej, both of 118 Noyes Rd., Vestal, N.Y. 13850

[21] Appl. No.: 257,503

[22] Filed: Jun. 8, 1994

[51] Int. Cl.⁶ .......................... A01K 91/06; A01K 97/00
[52] U.S. Cl. ........................................ 43/16; 43/15; 43/17
[58] Field of Search ................................ 43/16, 17, 25.2, 43/15

[56] References Cited

U.S. PATENT DOCUMENTS

| | | | |
|---|---|---|---|
| 2,766,543 | 10/1956 | Beck | 43/16 |
| 2,810,981 | 10/1957 | Littau | 43/16 |
| 3,023,532 | 3/1962 | Gorenty | 43/17 |
| 3,550,302 | 12/1970 | Creviston | 43/16 |
| 3,744,172 | 7/1973 | Kelli | 43/17 |
| 4,125,957 | 11/1978 | Cunningham | 43/17 |
| 4,235,036 | 11/1980 | Dawson | 43/17 |
| 4,872,280 | 10/1989 | Smith | 43/15 |

*Primary Examiner*—Kurt Rowan

[57] ABSTRACT

The fish strike alarm system has a flexible line for connecting between a pull actuated switch on an alarm indicator and the end of a fishing pole that is set in a flexed position by its attachment with a down rigger arrangement. The connection to the fishing pole is adjusted to be released by the fishing pole as it straightens due to a fish disturbing the bait and causing the fishing line to release from the down rigger arrangement.

10 Claims, 1 Drawing Sheet

U.S. Patent    Mar. 5, 1996    5,495,688
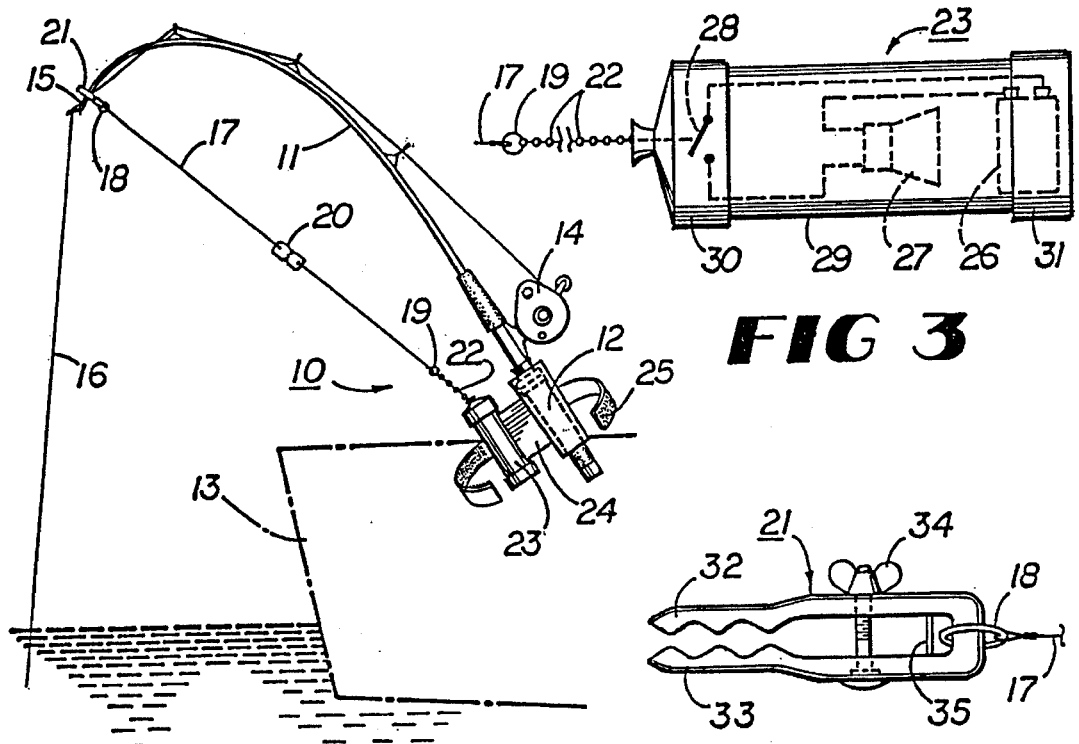
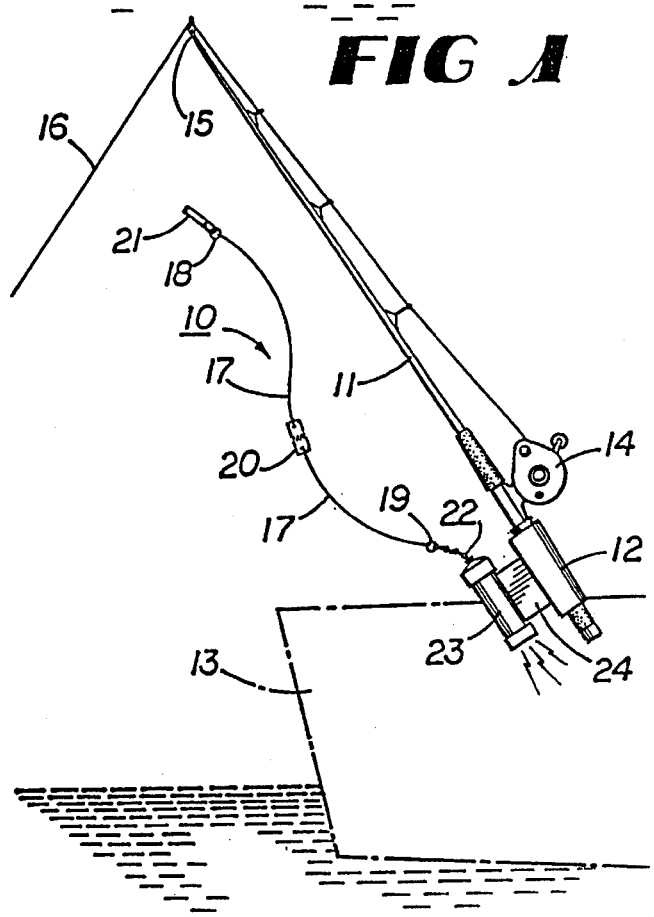
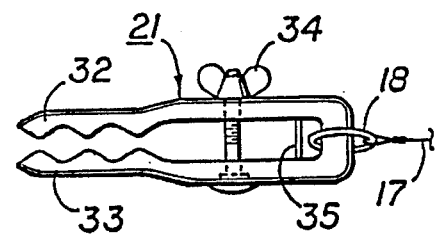
FIG 3
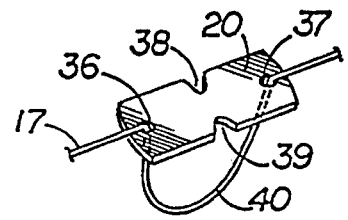
FIG 4
FIG 5A
FIG 5B
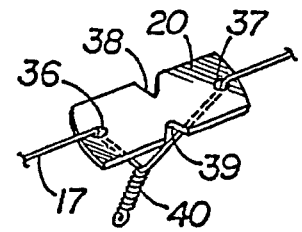
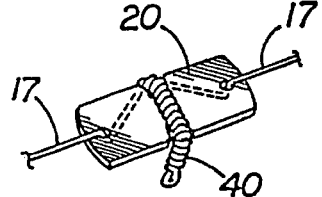
FIG 5C
FIG 1
FIG 2

5,495,688

FISH STRIKE ALARM SYSTEM

BACKGROUND OF THE INVENTION

1. Field of the Invention

The present invention, generally, relates to devices for indicating when a fish strikes a bait and, more particularly, to a new and improved device for giving an alarm when a fish strikes.

While previous devices may be useful in special situations, none provide the advantages and features that are available with a device constructed and arranged in accordance with the invention. For example, the present alarm device may be attached directly to the fishing rod, the rod holder or to the fishing boat, as will be described in more detail presently.

2. Description of the Prior Art

The art is repleat with prior efforts to provide helpful devices for fishermen to provide alarms when a fish strikes a bait. For example, U.S. Pat. No. 2,302,337 to Mantell describes a specific structural arrangement for a device to provide a signal only when the fishing pole is flexed.

U.S. Pat. No. 3,550,302 to Creviston et al. describes a particular structure for a device to provide oscillations that are translated to the fishing line, and when a fish is attracted to the line and strikes the line, a portion of the line is pulled free of a lever arm to actuate an alarm.

U.S. Pat. No. 4,202,126 to Pietrenka describes an alarm indicator that includes a uniquely formed actuator with a part that connects for movement by either the fishing pole or the fishing line to energize an alarm when movement occurs.

While these prior devices, at first appearance, have similarities to the present invention, they differ in material respects. These differences will be described in more detail hereinafter and are important for the effective use of the invention to achieve its advantages.

OBJECTS AND SUMMARY OF THE INVENTION

It is an important object of the present invention to provide an alarm device that accurately defines a distance between the alarm housing and a point near the tip of the fishing pole, which distance will change when a fish strikes, and the alarm will be actuated.

Briefly, a fish strike alarm that is constructed in accordance with the present invention includes a housing that can be attached firmly in a location near the reel end of a fishing pole. A line extends from the housing to a point at the end of the fishing pole after the end is flexed due to an attachment with a down rigger arrangement. Therefore, by this arrangement, the flexed end of the fishing pole straightens sharply when a fish strikes a bait or lure on fishing pole which movement pulls the line and actuates the alarm.

The above and other objects, features and advantages of the present invention will become more readily apparent as the detailed description of the presently preferred embodiment proceeds.

BRIEF DESCRIPTION OF THE DRAWINGS

FIG. 1 is an illustration of a fishing pole in a set position as with a down rigger arrangement having the fish strike alarm of the invention attached in a set condition.

FIG. 2 is an illustration of the same fishing pole as it would appear after a fish strikes and the alarm is actuated.

FIG. 3 is a side view in cross section of the alarm device used in the arrangement of the present invention.

FIG. 4 is an illustration of a side view for one form of a releasable attachment for the alarm system of the invention.

FIGS. 5A, 5B and 5C show an illustration of one form of a clip to adjust the length of a line in the alarm system of the invention.

DETAILED DESCRIPTION OF THE INVENTION

Referring now to FIG. 1, an alarm system that is arranged in accordance with the present invention is identified generally by the reference numeral 10 and is shown in a "set" condition attached to a fishing pole 11. The handle of the fishing pole 11 is shown inserted in a handle support 12 attached securely to a boat 13.

Attached to the fishing pole 11 is the usual reel 14 near the handle of the fishing pole 11, so that the reel 14 is easily and readily accessible to the user. The end 15 of the fishing pole 11 that is furthermost from the handle end is shown in a flexed condition due to an attachment with a down rigger.

A fishing line 16 extends from the reel 14, along the rod 11, past the end 15, and into the water where it is fastened releasibly to a down rigger weight. It is customary that a fish will strike a bait or lure on the fishing line 16 causing the fishing line 16 to pull away from the down rigger at the releasable fastener resulting in the fishing pole 11 straightening, as illustrated in FIG. 2.

The fish strike alarm system 10 includes a flexible line 17 of a length that permits it to extend from a first end 18 to a second end 19. The length of this flexible line 17, between the first and second ends 18 and 19, is just sufficient to span the distance from the flexed end 15 of the fishing pole 11 when the end 15 is flexed in a "set" condition, as illustrated in FIG. 1 of the drawings, While any flexible material can be used to form the line 17, a presently preferred material is a heavy duty fishing line.

An important modification, according to the invention, is that the length of the flexible line 17 can be adjusted by any suitable and convenient means, indicated generally by the reference numeral 20, to be described in more detail presently, The adjustable feature makes the alarm system 10 of the invention arranged so that it may be used with various and different fishing poles, as well as in different surroundings.

The first end 18 of the flexible line 17 has a crocodile clip 21 attached to fasten detachably to the fishing pole 11. A preferred form of the detachable crocodile clip 21 will be described in greater detail hereinafter.

The second end 19 of the flexible line 17 is attached to a chain 22 extending from an alarm 23, shown in more detail in FIG. 3 of the drawings. However, before leaving FIG. 1, the alarm 23 is attached and supported firmly in a position that is accessible to a user, such as to the fishing pole holder 12.

Of course, it is understood that the alarm 23 can be supported anywhere that is convenient to the user, and it is illustrated in FIGS. 1 and 2 as being supported by the fishing pole handle support 12. Also, any suitable means can be used to attach the alarm 23 to the support 12, such as a fixed attachment 24 attaching it rigidly, or alternatively, a loop and hook strap 25, available commercially under the trademark VELCRO, is more convenient in some cases.

Referring now to FIG. 3, the structural arrangement for the alarm 23 is illustrated in partial cross section. A simple series circuit interconnects a 9 volt battery 26, an annunciator 27 and a toggle switch 28. The chain 22 extends from the switch 28 by which the switch is toggled "on" and "off" by simply a pulling action.

The annunciator 27 is available commercially over-the-counter from any good electronics parts store, and according to the preferred embodiment, it is an electronic circuit device that emits a loud, ear-piercing, scream kind of sound that will rouse even a deeply snoozing fisherman or, as it has been said, a dead man.

The above described components are enclosed in a tubular housing 29 with ends 30 and 31. The over all length of the alarm housing 29 is in the order of 6 inches, and it is approximately 2.5 inches in diameter.

It is contemplated that the alarm housing 29 will be mounted and supported somewhat as illustrated in FIGS. 1 and 2 of the drawings, i.e., with the end 30, with the switch chain 22 extending from it, in a more elevated position than the end 31. The end 31 is removable more easily in order to service the battery 26, and the end 30 is formed to be more waterproof.

FIG. 4 shows a presently preferred arrangement for the releasable crocodile clip 21 that is attached at the end 18 of the flexible line 17. The inner surfaces of the two jaws 32 and 33 are uneven as shown so that the crocodile clip 21 will grip the fishing pole 11 near the end 15, as described above.

However, according to the invention, the jaws 32 and 33 are somewhat and slightly flexible so that while they will hold onto the fishing pole 11 sufficiently to support the flexible line 17 and its weight, the end 15 of the fishing pole 11 will pull away from it when a fish strikes and the fishing line 16 is released from the down rigger and the pole end 15 moves sharply to a straightened position, as illustrated in FIG. 2.

The force of the pull by the fishing pole 11 as it straightens is sufficient to pull on the chain 22 to actuate the alarm 23. Also as the chain 22 is pulled, the crocodile clip 21 is pulled free from the end 15 of the fishing pole 11, which permits the fishing pole 11 to be grasped by the user fisherman and removed from the pole support 12 to play the fish without interference from the strike alarm system 10.

A bolt and thumb screw 34 is located back from the jaws 32 and 33 to adjust the grip of the jaws on the fishing pole. As visible also in FIG. 4, a pin 35 keeps the end 18 of the flexible line 17 away from the bolt and thumb screw 34, which is helpful during re-setting the alarm system after it has been tripped.

When the alarm system 10 of the invention is to be used with different fishing poles or in different situations, it is desirable and most helpful to be able to adjust the length of the flexible line 17 easily and reliably. A preferred form of adjustment is provided by the piece 20, best seen in FIG. 5A.

In FIG. 5A, the piece 20 is illustrated as being flat with openings 36 and 37 located at opposite ends. The piece 20 is substantially rigid and formed of any suitable non-corrosive material, such as plastic. It is approximately 2 inches in length and 1 inch in width and is about ¼ inch thick.

The openings 36 and 37 are of sufficient size to permit the flexible line to slide through readily and easily. A deep groove is formed in each side of the piece 20, identified by the numerals 38 and 39.

In use, the piece 20 is positioned along the flexible line at a point where it is accessible conveniently to the user. With the fishing pole 11 in a "set" condition, as shown in FIG. 1, and with the ends 18 and 19 attached, also as shown in FIG. 1, a loop 40 is drawn through the piece 20, FIG. 5A, until much of the slack is removed from the flexible line 17, but the flexible line 17 does not pull hard enough on the chain 22 to actuate the switch Then, the loop 40 is twisted, as illustrated in FIG. 5B. Next, the twisted loop is wrapped around the piece 20 and pulled tightly into the slots 38 and 39, where it is retained, as shown by FIG. 5C. Since the end 15 of the fishing pole 11 will most likely be flexed in a different position each time the fishing line 16 is set with the down rigger, the piece will be adjusted for each set up of the alarm system 10.

The invention has been shown, described and illustrated in substantial detail with reference to the presently preferred embodiment. It is understood, however, that changes may be made without departing from the spirit and scope of the invention which is defined by the appended claims.

What is claimed is:

1. A system to issue an alarm when a fish strikes a bait on a fishing pole, comprising:

alarm indicator means, including switch means, for issuing a predetermined signal when actuated;

attachment means for retaining said alarm indicator means in a predetermined location relative to a user;

flexible line means having a predetermined length extending between a first end and a second end, said second end being attached to said alarm indicator means;

said second end of said flexible line means is connected to said switch means; and releasable means for connecting said first end of said flexible line means to the end of a fishing pole furthermost from a user when said fishing pole is flexed in a set position;

so that when a fish strikes and said fishing pole straightens from said set position, said switch means actuates said alarm indicator means to issue said predetermined signal.

2. A system to issue an alarm as defined by claim 1 wherein said predetermined location of said attachment means is at the end of said fishing pole nearest said user.

3. A system to issue an alarm as defined by claim 1 wherein said predetermined length of said flexible line means includes means to adjust said predetermined length, so that said device is attachable to fishing poles of different lengths.

4. A system to issue an alarm as defined by claim 1 wherein said predetermined signal issued by said alarm indicator means is audible at a high pitch to be characterized as a "screamer".

5. A system to issue an alarm when a fish strikes a bait on a fishing pole, comprising:

alarm indicator means including housing means enclosing speaker means, battery means and switch means connected for issuing a predetermined signal when actuated;

attachment means for retaining said alarm indicator means in a predetermined location relative to a user;

flexible line means having a predetermined length extending between a first end and a second end, said second end being attached to said alarm indicator means; and releasable means for connecting said first end of said flexible line means to the end of a fishing pole furthermost from a user when said fishing pole is flexed in a set position;

whereby when a fish strikes and said fishing pole straightens from said set position, said flexible line means actuates said alarm indicator means to issue said predetermined signal.

6. A system to issue an alarm when a fish disturbs a fishing line, comprising:

alarm indicator means for issuing a predetermined signal when actuated, including attaching means for retaining said alarm indicator means in a predetermined location;

said alarm indicator means includes a pull chain switch that is toggled off and on when pulled to control said predetermined signal;

flexible line means having a predetermined length extending from said alarm indicator means to a point adjacent an end of a fishing pole that is flexed;

said length of said flexible line means is adjustable; and connector means attached to said flexible line means for connecting an end of said flexible line means releasibly to said fishing pole;

whereby said flexible line means can be pulled when said flexed fishing pole is released by a fish, and the pull of the released flexible line means actuates said alarm indicator means.

7. A system to issue an alarm as defined by claim 6 wherein said connector means is in the form of an adjustable crocodile clip for controlling the releasable attachment force of connection between said flexible line means and said fishing pole in its flexed position, and wherein said signal issued by said alarm indicator means is a high intensity audible sound.

8. A system to issue an alarm as defined by claim 6 wherein said flexible line means is continuous from one end attached to said alarm indicator means to said end of said flexed fishing pole, and said flexible line means includes means to adjust its predetermined length repeatedly when desired.

9. A system to issue an alarm as defined by claim 8 wherein said means to adjust said length of said flexible line means is in the form of a substantially flat piece of rigid material with holes at opposite ends.

10. A system to issue an alarm as defined by claim 9 wherein said means to adjust said length of said flexible line means includes V-shaped notches on opposite sides to receive a twisted portion of said flexible line means to maintain a length of said flexible line means at said predetermined length.

* * * * *